(No Model.)
J. D. McANULTY.
SAW GIN.
No. 439,601. Patented Oct. 28, 1890.
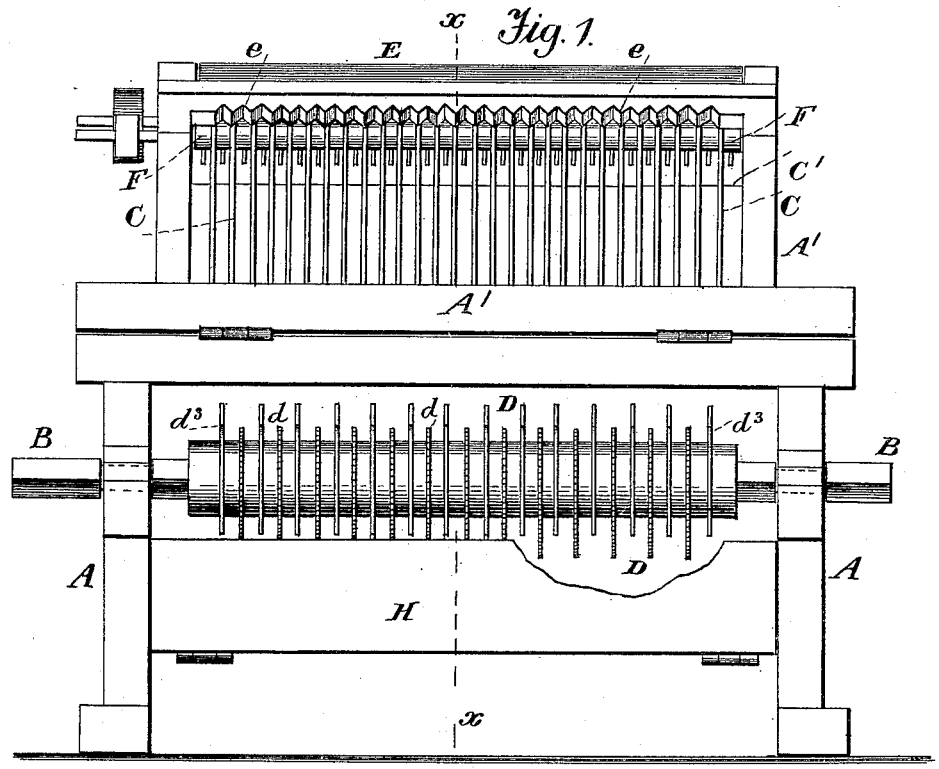
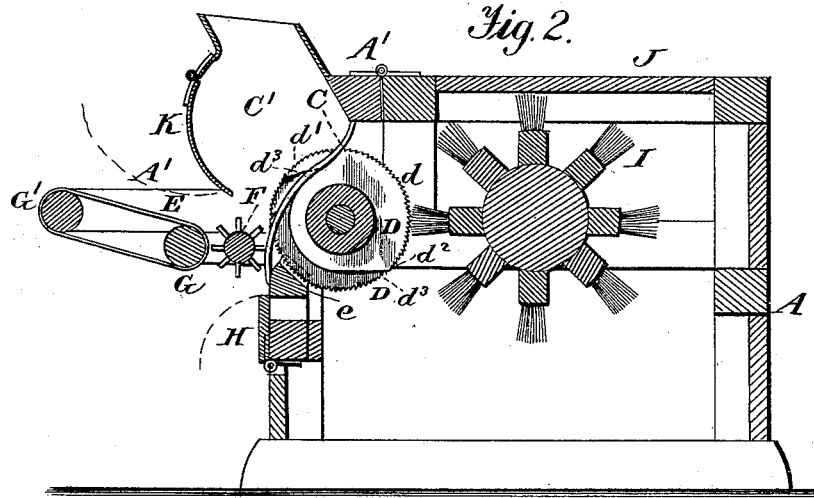
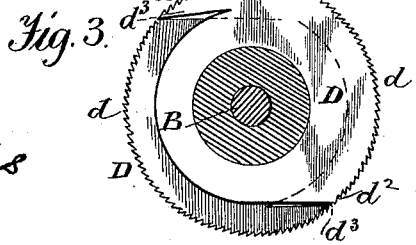
Witnesses.
A. Ruppert
Wm. Burris
Inventor.
Jefferson D. McAnulty
Per
Thomas P. Simpson
Atty

UNITED STATES PATENT OFFICE.

JEFFERSON D. McANULTY, OF PIONEER MILLS, ASSIGNOR OF ONE-THIRD TO SAMUEL F. HOUSTON, OF CHARLOTTE, NORTH CAROLINA.

SAW-GIN.

SPECIFICATION forming part of Letters Patent No. 439,601, dated October 28, 1890.

Application filed September 30, 1889. Serial No. 325,552. (No model.)

*To all whom it may concern:*

Be it known that I, JEFFERSON D. MC-ANULTY, a citizen of the United States, residing at Pioneer Mills, in the county of Cabarrus and State of North Carolina, have invented certain new and useful Improvements in Saw-Gins; and I do declare the following to be a full, clear, and exact description of the invention, such as will enable others skilled in the art to which it appertains to make and use the same, reference being had to the accompanying drawings, and to the letters of reference marked thereon, which form a part of this specification.

The objects of my invention are to lessen the cost of ginning cotton, to improve the sample, and to clean the seed thoroughly; also, to make a gin more durable.

Figure 1 of the drawings is a front elevation of my improved gin, with the hinged frame thrown up; Fig. 2, a transverse vertical section of the same on the dotted lines $x\ x$ of Fig. 1, with the hinged frame down; Fig. 3, a detail view illustrative of my improved saw.

In the drawings, A represents the fixed frame, in which is journaled the saw-shaft B, and A' is a hinged frame carrying the parallel ribs C, between which rotate the toothed portions of the peripheries of my saws D. The saw-teeth $d$ of each row extend around half the periphery of the saw from $d'$ to $d^2$, while the remaining half of the periphery is cut away so as not to pass up through but only to the spaces between the ribs. I also incidentally make a point or hook $d^3$ in order to make a subjacent opening for the escape of the seed.

The saws are so arranged on their shaft that the point $d'$ of one saw may be exactly opposite to or a little forward of the point $d^2$ of the adjacent saw. This construction and arrangement of the saw-teeth causes each saw to act upon a different part of the roll of cotton, and thus the cotton is distributed more equally among the saws.

On the hinged frame A', I arrange the endless apron E, on which is carried the feed of cotton to the spiked roller F, which transfers it to the ribs $c$, so as to be conveniently reached by the saws. This apron is carried by the rollers G G', one of which, as well as the spiked rollers F, has an extension of its shaft, so as to be rotated by any suitable mechanism, the spiked roller being run at about twice the velocity of the apron, so as to transfer the cotton to the saws as rapidly as it is presented by the apron. By feeding at the bottom of the roll-box the cotton and unginned seed have a tendency to drop down, and in order to prevent this the gin-frame is shut up on all four sides down to the floor. The brush will get sufficient air at the lower ends of the ribs to hold the cotton and uncleaned seed until they are carried up to the roll by the saws.

By feeding at the bottom of the roll-box, nails, sand, stone, and pieces of metal, which ordinarily go into the roll-box and rapidly wear out the gin, never get into the gin at all, thus making it last longer and require less expense in repairs. My feed also leaves the cotton in its natural shape, as it cannot become wadded together.

As the saws revolve faster than the roll and part of the periphery is cut away, they run through different parts of the roll at each half-revolution and thereby catch more cotton, while the cotton and unginned seed are prevented from dropping by the suction of the current of air up through the ribs, the same being produced by the gin-brush. It will be observed that the toothed portion of each saw passes up through the ribs and seizes the lint, while the cut-away portion of the periphery only reaches up to the space between the ribs, so as to prevent the escape of the unseparated lint and seed. The space left under the hook $d^3$ forms a passage for the seed which has been separated from the lint.

By the above-described shape and arrangement of saws the roll of cotton is being continually shaken up so as to keep it loose, soft, and uncompacted. In this condition the lint is much less liable to be cut.

The saws may have any suitable spacers between them and may be fastened to their shaft in any preferred way.

J is the removable cover arranged over the brush, and C' the receptacle for the roll of cotton.

K is a door arranged in the front wall of the roll-box on the hinged frame A' and just over the roller G, which is nearest to the spiked roller F, the said door extending from one end of the roll-box to the other.

The object of the door K is to enable the roll of cotton to be loosened whenever it becomes hard or tight.

What I claim as new, and desire to protect by Letters Patent, is—

1. In a cotton-gin, the combination, with the saw-shaft and parallel ribs $c$, of the saws D, having equal parts of their periphery with and without teeth, the toothed part extending through and the part without teeth cut away to come only up to the space between the teeth, an open space being left under the the point $d^3$, and the toothed portion of one saw being arranged opposite the cut-away portion of each next adjacent saw, as described.

2. In a cotton-gin, the combination, with the saws and hinged frame carrying the ribs $c$, of the apron E, arranged on rollers, and the spiked roller F, as and for the purpose set forth.

In testimony whereof I affix my signature in presence of two witnesses.

JEFFERSON D. McANULTY.

Witnesses:
 H. S. PURYEAR,
 J. R. EWIN.